United States Patent [19]
Edwards et al.

[11] Patent Number: 5,977,753
[45] Date of Patent: Nov. 2, 1999

[54] BUCK REGULATOR WITH PLURAL OUTPUTS

[75] Inventors: Gary Arthur Edwards, Carleton Place; Raymond Kenneth Orr, Kanata, both of Canada

[73] Assignee: Astec International Limited, Hong Kong, The Hong Kong Special Administrative Region of the People's Republic of China

[21] Appl. No.: 09/082,515

[22] Filed: May 21, 1998

[30] Foreign Application Priority Data

Jan. 23, 1998 [CA] Canada .................................. 2227747

[51] Int. Cl.$^6$ ..................................................... G05F 1/656
[52] U.S. Cl. ............................................................... 323/222
[58] Field of Search ................................... 323/266, 268, 323/271, 222; 363/16, 20, 21

[56] References Cited

U.S. PATENT DOCUMENTS

| | | | |
|---|---|---|---|
| 5,287,261 | 2/1994 | Ehsani ...................................... | 323/222 |
| 5,502,630 | 3/1996 | Rokhwarg ................................ | 323/222 |
| 5,541,828 | 7/1996 | Rozman .................................... | 363/21 |
| 5,552,695 | 9/1996 | Schwartz .................................. | 323/271 |
| 5,559,684 | 9/1996 | Ohms et al. .............................. | 363/25 |

*Primary Examiner*—Matthew Nguyen
*Attorney, Agent, or Firm*—Coudert Brothers

[57] ABSTRACT

A buck regulator provides two outputs via two transformer-coupled inductors each coupled to a respective output capacitor and to a respective diode or switch for allowing current to flow in the respective inductor for charging the respective output capacitor during intervals between pulses of a pulsed input supply. One of the inductors is directly coupled and the other of the inductors is coupled via a further capacitor to the pulsed input supply so that current for charging the respective output capacitors flows in both inductors during the pulses. Each inductor can be tapped, and/or the transformer turns of the inductors are equalized, so that no a.c. voltage appears across the further capacitor and the output voltages can be different. The output voltages can also be stacked or of opposite polarities.

23 Claims, 4 Drawing Sheets

BUCK REGULATOR WITH PLURAL OUTPUTS

This invention relates to buck regulators, and is particularly concerned with providing plural outputs from a buck regulator. The term "buck regulator" is used herein to include all forms of buck and buck-derived voltage regulators and converters.

BACKGROUND OF THE INVENTION

It is known as described below to provide a buck regulator, which includes a first inductor, capacitor, and freewheel diode or switch for producing a first regulated output voltage across the capacitor from a pulsed input supply, the pulses being controlled to provide the regulation, with a second inductor, capacitor, and diode or switch for producing a second output voltage across the second capacitor by inductive or transformer coupling of the second inductor to the first inductor. However, the presence of the second output adversely affects the performance of the regulator, especially the regulation of the first output voltage, unless the load for the second output voltage is relatively small.

An object of this invention is to provide an improved buck regulator for providing at least two output voltages.

SUMMARY OF THE INVENTION

One aspect of this invention provides a buck regulator comprising: a first capacitor; a first inductor having an output end coupled to the first capacitor, the first inductor being responsive to a pulsed input supply for supplying current to the first capacitor during pulses of the input supply to charge the first capacitor to a first output voltage; a first device for maintaining current in the first inductor for charging the first capacitor between pulses of the input supply; a second capacitor; a second inductor, inductively coupled to the first inductor so that the first and second inductors form a transformer, the second inductor having an output end coupled to the second capacitor; a second device for allowing current flow in the second inductor between pulses of the input supply to charge the second capacitor to a second output voltage; and a further capacitor coupled between the first and second inductors at points thereof other than the output ends of the inductors, for allowing current flow in the second inductor for charging the second capacitor during pulses of the input supply.

The first and second inductors preferably have substantially equal numbers of turns of the transformer between the points of the inductors to which the further capacitor is coupled and the output ends of the inductors, so that substantially no a.c. voltage appears across the further capacitor.

The points of the first and second inductors at which the further capacitor is coupled can be ends of the first and second inductors distant from the output ends thereof, or the point of at least one of the first and second inductors at which the further capacitor is coupled can be a tap between ends of the respective inductor.

The first device can be coupled to a tap between ends of the first inductor, or the second device can be coupled to a tap between ends of the second inductor, to enable the first and second output voltages to be different.

A junction between the second capacitor and the second device can be coupled to a junction between the first capacitor and the first device, or it can be coupled to the output end of the first inductor to provide stacked output voltages. Alternatively, the output end of the second inductor can be coupled to a junction between the first capacitor and the first device, and a junction between the second capacitor and the second device can be coupled to an output terminal for the second output voltage, to provide opposite polarity output voltages.

Another aspect of the invention provides a circuit comprising a first capacitor; a first inductor; a controlled switch for supplying current, when the switch is closed, via the first inductor to the first capacitor for charging the first capacitor to a first output voltage; a first freewheel device for maintaining current via the first inductor when the switch is opened; a second inductor inductively coupled to the first inductor; a second capacitor and a second device coupled to the second inductor for supplying current to the second capacitor for charging the second capacitor to a second output voltage when the switch is closed; and a further capacitor coupled between the first and second inductors for allowing current to flow in the second inductor for charging the second capacitor when the second device is non-conductive.

A further aspect of the invention provides a buck regulator providing two outputs via respective inductively coupled inductors each coupled to a respective output capacitor and to a respective device for allowing current to flow in the respective inductor for charging the respective output capacitor during intervals between pulses of a pulsed input supply, wherein one of the inductors is directly coupled and the other of the inductors is capacitively coupled to the pulsed input supply so that current for charging the respective output capacitors flows in both inductors during said pulses.

BRIEF DESCRIPTION OF THE DRAWINGS

The invention will be further understood from the following description with reference to the accompanying drawings, in which.

DETAILED DESCRIPTION

Figure 1:
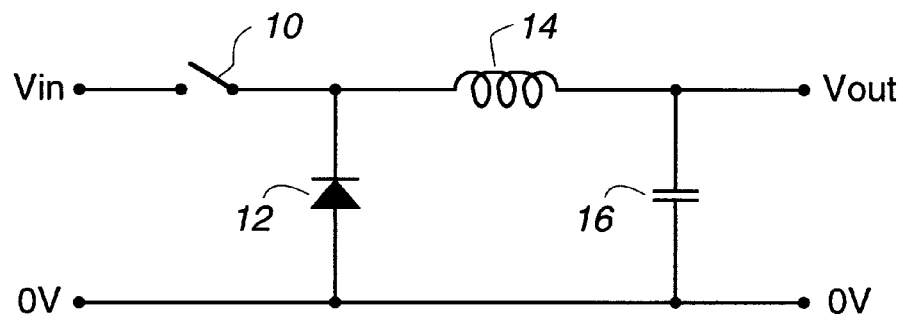
FIG. 1 schematically illustrates a basic buck regulator known in the art.

As illustrated in FIG. 1 and as is well known, a basic buck regulator comprises a switch 10, diode 12, inductor 14, and capacitor 16 arranged between input terminals for an input voltage Vin relative to ground or 0 V and output terminals for a regulated output voltage Vout relative to ground or 0 V. The switch 10 is typically a power MOSFET which is controlled in known manner by a feedback and control circuit (not shown) responsive to the output voltage Vout. The switch 10 is typically controlled by the control circuit at a high fixed frequency with a variable duty cycle. When the switch 10 is closed, the capacitor 16 is charged via the switch 10 and the inductor 14 from the input voltage Vin to produce the output voltage Vout, which is consequently less than the peak input voltage Vin. The input voltage Vin can be from a d.c. supply or it can be pulsed in synchronism with the operation of the switch 10. When the switch 10 is open, current through the inductor 14 is maintained via the diode 12.

As is well known in the art, more complicated voltage regulators and converters can be derived from the basic buck regulator, for example by combining the basic buck regulator of FIG. 1 with a transformer and/or a boost regulator in various arrangements, but all of these derivations incorporate the components of FIG. 1 or their equivalents and are included in the term "buck regulator" as used herein. Typical examples of equivalents are the replacement of switches by diodes, and/or of diodes by switches, in appropriate circumstances which may depend on the nature of the load to which the output voltage Vout is supplied and/or the nature of the input voltage Vin, e.g. whether this is a d.c. or pulsed supply.

Figure 2:
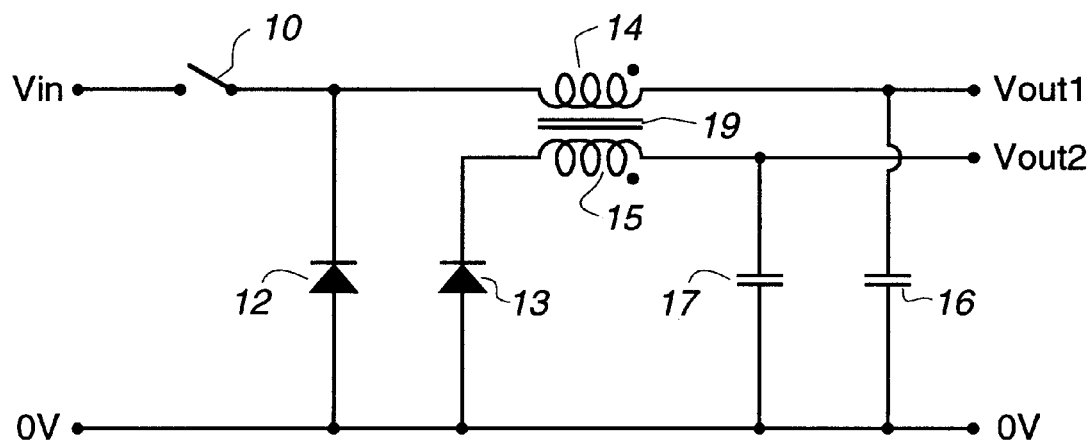
FIG. 2 schematically illustrates a buck regulator for providing two outputs in known manner.

It is known to duplicate parts of the regulator of FIG. 1 in order to provide a second or auxiliary output voltage; such an arrangement is illustrated in FIG. 2, in which the switch 10, diode 12, inductor 14, and capacitor 16 are provided in the same manner as in FIG. 1 to provide a first output voltage Vout1. A second inductor 15 is inductively coupled to the inductor 14, formring a transformer 19. Dots adjacent the windings show the relative phases of the windings in conventional manner. An output end of the inductor 15 is coupled via a second capacitor 17 to ground or 0 V to provide a second output voltage Vout2, and a second diode 13 is coupled between ground or 0 V and the other end of the second inductor 15.

Figure 3:
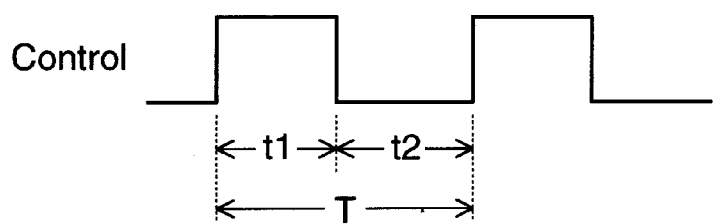
FIG. 3 illustrates a control signal for the buck regulator of FIG. 2.

FIG. 3 illustrates a control signal for the switch 10 of the buck regulator of FIG. 2. As shown in FIG. 3, the control signal is a rectangular waveform at a fixed high frequency (for example, 100 kHz or more) with a period T. The duty cycle of this waveform is varied under the control of the feedback and control circuit mentioned above, so that time intervals t1 and t2 (t1+t2=T) during each cycle of the waveform are variable. The switch 10 is closed for each interval t1 and open for each interval t2.

During each interval t1, with the switch 10 closed, the diode 12 is reverse biased by the input voltage Vin which is positive with respect to ground or 0 V, and the diode 13 is also reverse biased by a positive voltage induced across the second inductor 15. During each interval t2, current through the first inductor 14 is maintained by conduction via the diode 12 as soon as this diode is forward biased by the collapse of the magnetic field of the inductor 14, and the diode 13 becomes forward biased so that energy from the transformer 19 is coupled to the capacitor 17 which supplies the second output voltage Vout2.

The regulator of FIG. 2 has the disadvantage that energy is only supplied to the capacitor 17 during each interval t2, whereas there is a continuous drain of energy from the capacitor 17 to a load (not shown) supplied with the second output voltage Vout2, tending to discharge the capacitor 17. As a result, this load must be relatively small in order to avoid a significant variation or ripple of the second output voltage Vout2. Furthermore, any such ripple has a significant adverse effect on the first output voltage Vout1. This situation arises because during each interval t1, when the switch 10 is closed, the capacitor 16 continues to be supplied with energy to maintain the voltage Vout1 whereas the capacitor 17 does not so that the output voltage Vout2 tends to fall; consequently at the start of each interval t2, when the switch 10 opens, the diode 13 becomes forward biased before the diode 12 and energy is supplied to the capacitor 17 rather than to the capacitor 16. There are consequently increased peak-to-peak current variations and increased ripple for the first output voltage Vout1.

Thus a regulator such as that of FIG. 2 has the disadvantages that current from the second output adversely affects the regulation and must be much less than current from the first output, ripple and peak currents are increased, resulting in increased noise, and efficiency is reduced. These disadvantages are reduced by regulators in accordance with embodiments of this invention.

Figure 4:
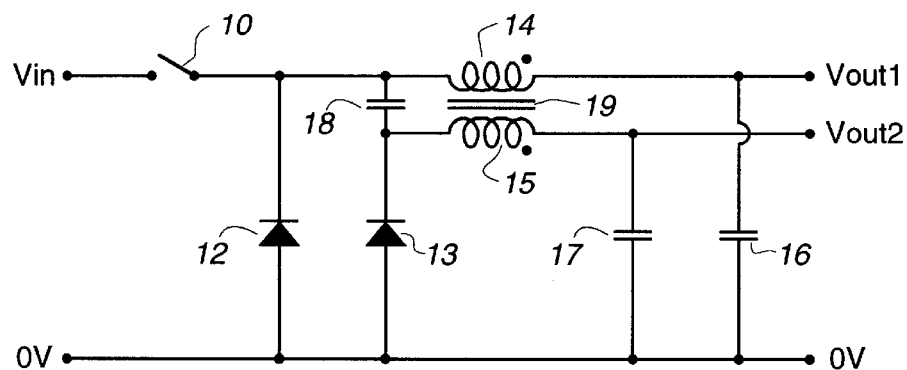
FIG. 4 schematically illustrates a form of buck regulator in accordance with an embodiment of the invention.

FIG. 4 shows a buck regulator in accordance with an embodiment of the invention, which is the same as the regulator of FIG. 2 except for the addition of a capacitor 18 which is connected between the input ends of the inductors 14 and 15, which in this case are assumed to have the same number of turns on the transformer 19 (i.e. a 1 to 1 turns ratio) so that a.c. voltages induced across the winding 15 are equal to the inducing a.c. voltages across the inductor 14. The output ends of the inductors 14 and 15 are grounded for a.c because they are coupled to ground or 0 V by the capacitors 16 and 17 respectively. Consequently there is substantially no a.c. voltage across the capacitor 18.

As a result, the capacitor 18 ties the capacitors 16 and 17 in parallel with one another for a.c. via the windings 14 and 15 respectively, so that current flows via the inductor 15 to charge the capacitor 17 during each interval t1 as well as during each interval t2. This is in contrast to the regulator of FIG. 2, in which no current flows in the inductor 15 during each interval t1 because the diode 13 is reverse biased and there is no other path for current flow. Thus the regulator of FIG. 4 considerably reduces or avoids disadvantages of the regulator of FIG. 2.

It can be appreciated that although in the regulator of FIG. 2 the capacitor 18 is connected between the input ends of the inductors 14 and 15, which are equally distant from the output ends of the inductors in terms of the number of turns of these inductors on the transformer 19, the capacitor 18 could instead be connected between other equivalent points (equal number of turns from the inductor output ends) along the inductors 14 and 15 by providing taps on these inductors. The provision of at least one such tap enables the second output voltage to be different from the first output voltage, as described below with reference to FIGS. 5 to 9.

Figure 5:
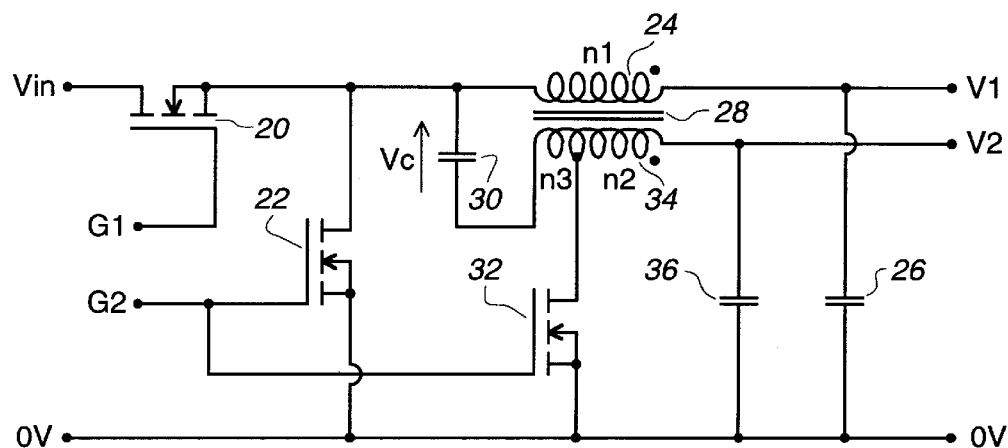
FIG. 5 schematically illustrates a buck regulator in accordance with another embodiment of the invention.

FIG. 5 shows a buck regulator in which a power MOSFET 20 corresponds to the switch 10 of FIG. 4 and is controlled by a signal G1 supplied to its gate for switching the input voltage Vin. A MOSFET 22, controlled by a signal G2 supplied to its gate, constitutes a synchronous rectifier corresponding to the diode 12 of FIG. 4. An inductor 24, which is one winding having a number n1 of turns of a transformer 28, corresponds to the inductor 14 of FIG. 4 and is coupled between the MOSFET 20 and an output terminal for a first output voltage V1 which is less than (the peak value of) the input voltage Vin. A capacitor 26, corresponding to the capacitor 16 of FIG. 4, is coupled between this output and ground or 0 V.

Another inductor 34, corresponding to the inductor 15 of FIG. 4, constitutes a second winding of the transformer 28 and has the same number n1 of turns, with a tap along this winding dividing it into a first part having n2 turns and a second part having n3 turns, with n1=n2+n3. Dots adjacent the output ends of the inductors 24 and 34 indicate the relative phases of the windings as in FIG. 4. A MOSFET 32, also controlled by the signal G2 supplied to its gate, constitutes another synchronous rectifier connected between the tap and ground or 0 V and corresponds to the diode 13 of FIG. 4. The output end of the inductor 34 is connected to an output terminal for a second output voltage V2 which is less than V1, and a capacitor 36, corresponding to the capacitor 17 of FIG. 4, is coupled between this output and ground or 0 V. The other end of the inductor 34 is coupled via a capacitor 30, corresponding to the capacitor 18 of FIG. 4, to the input end of the inductor 24, i.e. to the junction between the MOSFETs 20 and 22 and the inductor 24.

Figure 6:
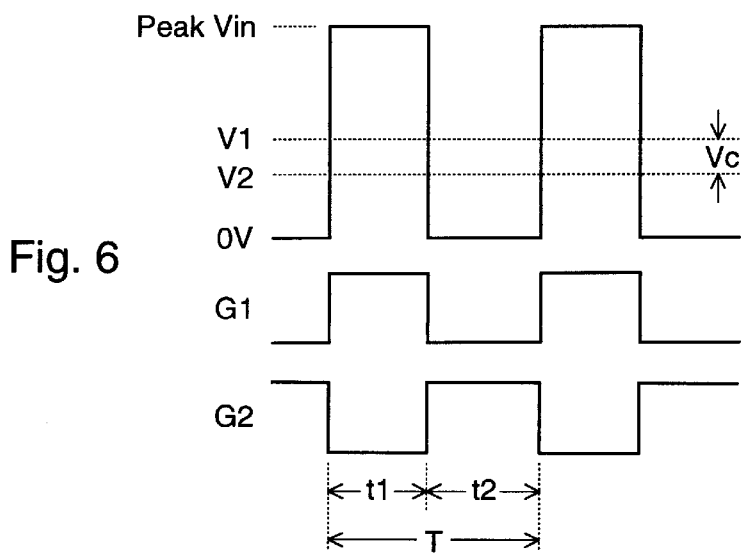
FIG. 6 illustrates voltages and signals relating to operation of the buck regulator of FIG. 5.

FIG. 6 illustrates the signals G1 and G2 and the voltages Vin, V1, and V2 in respect of the buck regulator of FIG. 5. The signal G1 is the same as the control signal shown in FIG. 3, and the signal G2 is an oppositely phased rectangular waveform. During each interval t1, the MOSFET 20 conducts (closed switch) and the MOSFETs 22 and 32 are non-conductive. During each interval t2, the MOSFET 20 is non-conductive (open switch) and the MOSFETs 22 and 32 conduct.

The elements 20 to 26 in the buck regulator of FIG. 5 operate in the conventional manner described above to provide the output voltage V1. Thus during each time interval t1, the MOSFET 20 conducts so that the capacitor 26 is charged via the inductor 24, and during each time interval t2 the MOSFET 22 conducts to maintain current flow in the inductor 24. Also during each interval t1 substantially zero a.c. voltage is maintained across the capacitor 30 because the inductors 24 and 34 have the same number of n1 turns on the transformer 28, so that current flows in the inductor 34 to maintain the output voltage V2 across the capacitor 36.

During each interval t2, the voltage V1 appears across the inductor 24 because the MOSFET 22 is conductive, and by transformer action the same voltage V1 appears across the inductor 34; the MOSFET 32 is also conductive so that the tap is at ground or 0 V. Consequently, the junction between the inductor 34 and the capacitor 30 has a negative voltage −Vc, and the capacitor 30 becomes charged to the Voltage Vc as illustrated. This voltage Vc is determined by the turns ratio n3 to n1. Specifically, Vc=(n3/n1) V1. Correspondingly, the output voltage V2=V1−Vc. Thus the voltage V2 can be determined to be any desired value less than V1 by selection of a corresponding turns ratio n3 to n1.

It is desirable for the output voltage V2 of the regulator of FIG. 5 to be of the same order of magnitude as the output voltage V1, and for the current drawn from this output to be less than the current drawn from the output at the voltage V1. For example, the output voltage V1 may be 5 volts, and the lower output voltage V2 may be 3.3 volts, for supplying electronic circuits with these respective supply voltages. As shown in FIG. 6, the input voltage Vin can itself be a switched voltage which changes synchronously with the signals G1 and G2 between zero and a peak voltage Peak Vin; for example it may be supplied from a pre-regulator or voltage converter operating synchronously with the buck regulator. Alternatively, the voltage Vin may be from a d.c. supply.

Figure 7:
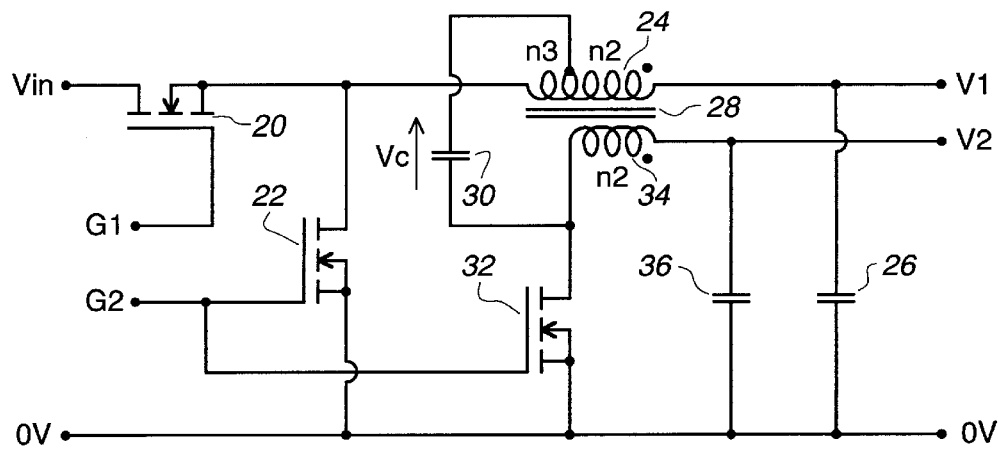
FIG. 7 schematically illustrates an alternative arrangement of the buck regulator in accordance with a further embodiment of the invention.
Figure 8:
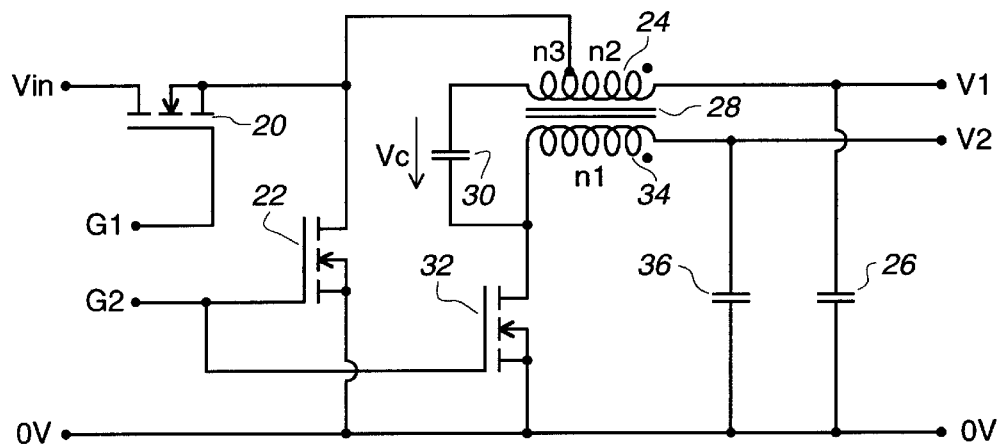
FIGS. 8 and 9 schematically illustrate buck regulators in which a second output voltage is greater than a first output voltage, in accordance with other embodiments of the invention.
Figure 9:
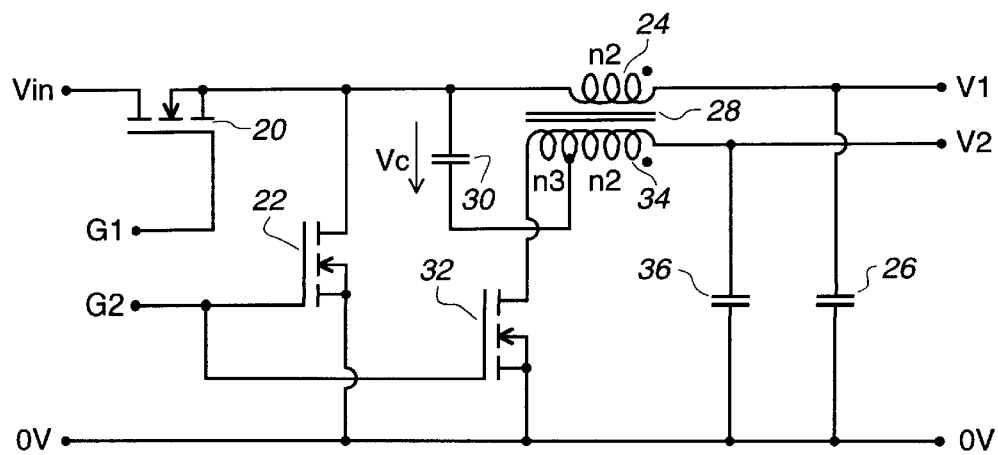

FIGS. 7, 8, and 9 illustrate alternative arrangements of the buck regulator of FIG. 5 in accordance with embodiments of the invention. In each case the same references are used as in FIG. 5, and each arrangement and its operation is the same as described above except as described below. In each case n1=n2+n3 as for the arrangement of FIG. 5.

In the arrangement of FIG. 7, the inductor 24 has a tap at a point with n2 turns between the tap and the output end of the inductor and n3 turns between the tap and the input end of the inductor connected to the MOSFETs 20 and 22. Instead of being connected between the ends of the inductors 24 and 34 as in FIG. 2, the capacitor 30 is connected between this tap and the corresponding point on the inductor 34, to which the MOSFET 32 is connected, n2 turns from the output end of the inductor 34. There is consequently no connection for the n3 turns of the inductor 34 as shown in FIG. 5, and these are omitted from the arrangement of FIG. 7. Thus in this arrangement the inductor 34 comprises only n2 turns of the transformer 28. The capacitor 30 again has substantially no a.c. voltage across it, because both of its ends are n2 turns from the a.c. grounds at the outputs. In this arrangement, as in the case of FIG. 5, Vc=(n3/n1) V1.

The arrangements of FIGS. 8 and 9 provide for the output voltage V2 to be greater than the output voltage V1.

In the arrangement of FIG. 8, the junction of the MOSFETs 20 and 22 is connected to a tap of the inductor 24 n2 turns from its output end for the voltage V1. The other end of the inductor 24, n3 turns from the tap, is connected to one terminal of the capacitor 30, the other terminal of which is connected to the non-output end of the inductor 34 having n1 turns. The MOSFET 32 is in this case connected to this same, non-output, end of the inductor 34. The capacitor 30 again has substantially no a.c. voltage across it, because both of its ends are n1 turns from the a.c. grounds at the outputs.

The arrangement of FIG. 9 is similar to that of FIG. 8, except that the capacitor 30 is connected between points n2 turns from the output ends of the inductors 24 and 34, so that again there is substantially no a.c. voltage across the capacitor 30. In this case there is no connection for the n3 turns of the inductor 24 that are present in the arrangement of FIG. 8, and these are omitted from the arrangement of FIG. 9 so that the inductor 24 comprises only n2 turns.

In the arrangements of the buck regulator of FIGS. 8 and 9, during each interval t2 the voltage V1 appears across n2 turns of the inductor 24, so that across n3 turns of this inductor (in the case of FIG. 8) or of the inductor 34 (in the case of FIG. 9) there is a voltage Vc=(n3/n2) V1 to which the capacitor 30 is charged, with the opposite polarity as illustrated compared with the arrangements of FIGS. 5 and 7. In each case the output voltage V2 produced across the n1 turns of the inductor 34 is given by the equation:

$$V2 = \frac{n1}{n2} V1 = \frac{n2+n3}{n2} V1 = V1 + Vc.$$

It can be seen that, in all of the arrangements of the buck regulator of FIGS. 5, 7, 8, and 9, selecting n3 to be zero, so that n2=n1, results in the tap being moved to the input end of the respective inductor to result in the same circuit which corresponds to the arrangement of FIG. 4, with V2=V1. This has particular usefulness for providing stacked regulated voltages and opposite polarity regulated voltages, as described below with reference to FIGS. 10 and 11 respectively. Conversely, it can be appreciated that the arrangement described above with reference to any of FIGS. 5, 7, 8, and 9, using a tap n2 turns from the output end of one of the inductors, can also be applied to the regulators of FIGS. 10 and 11 to provide unequal stacked or opposite polarity regulated voltages.

Figure 10:
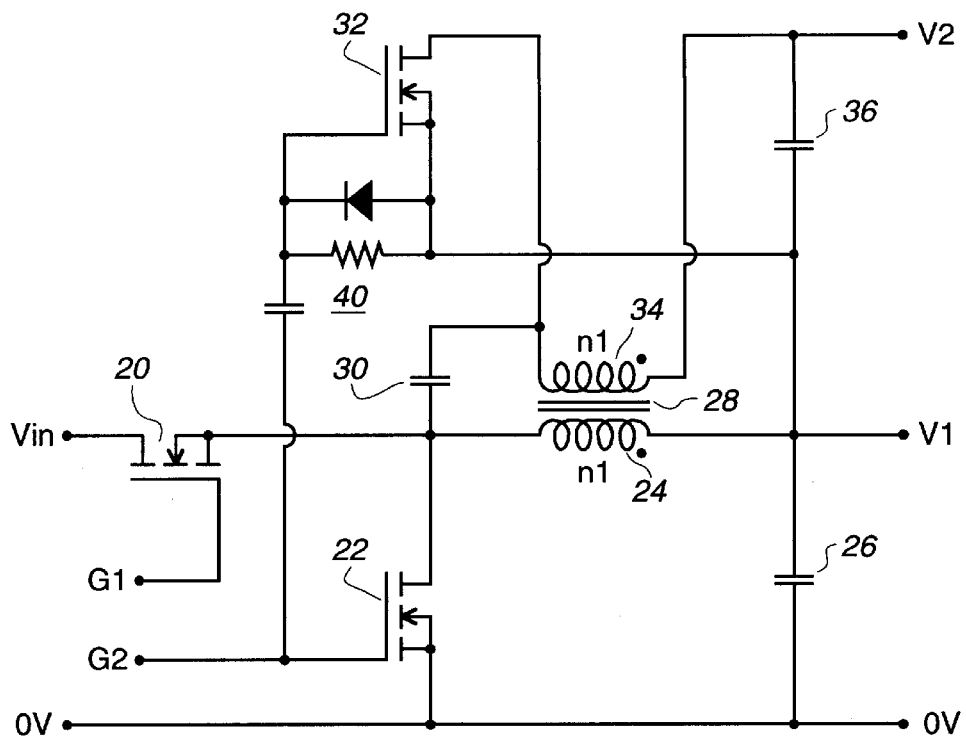
FIG. 10 schematically illustrates a buck regulator in which a second output voltage is stacked on a first output voltage, in accordance with yet another embodiment of the invention.
Figure 11:
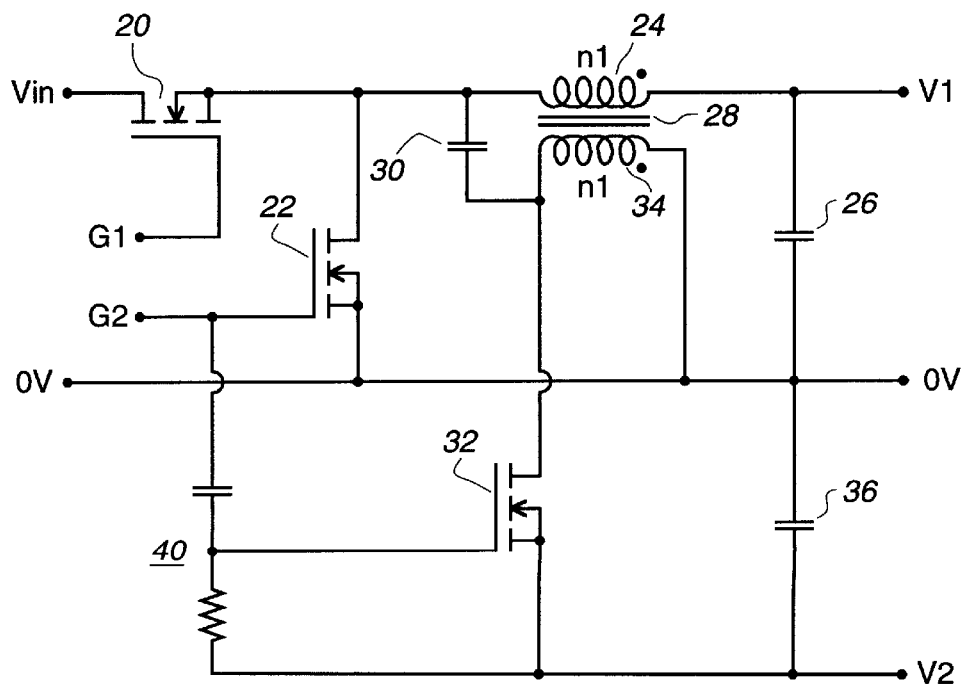
FIG. 11 schematically illustrates a buck regulator in which a second output voltage has an opposite polarity to a first output voltage, in accordance with a further embodiment of the invention.

In FIGS. 10 and 11 the same references as in FIG. 5 are again used, and the operation is the same as described above except as described below.

Referring to FIG. 10, the buck regulator illustrated therein is the same as that of FIG. 5 (or any of FIGS. 7 to 9) with n3 reduced to zero, except for the d.c. level connections of the source of the MOSFET 32 and the capacitor 36, and the gate drive to the MOSFET 32. As shown in FIG. 10, the source of the MOSFET 10 and the terminal of the capacitor 36 that is not connected to the inductor 34 and the output for the voltage V2 are connected to the output end of the inductor 24, and hence to the level of the output voltage V1, rather than to ground or 0 V as in FIG. 5. Consequently, in this regulator the output voltage V2 is stacked or added to the output voltage V1. For example, if the output voltage V1 is +5 V then the output voltage V2 is twice this, i.e. +10 V.

In order to drive the gate of the MOSFET 32 properly relative to the d.c. level of V1 to which the source of this MOSFET 32 is connected, in the regulator of FIG. 10 the signal G2 is supplied to the gate of the MOSFET 32 via a level shifter 40. The level shifter 40 in this case comprises a capacitor connected between the input for the signal G2 and the gate of the MOSFET 32, and a resistor and diode each connected between the gate and source of the MOSFET 32.

It can be appreciated that instead of being connected to be at the d.c. level of the output voltage V1, the source of the MOSFET 32 and terminal of the capacitor 36 could be connected to any d.c. level with reference to which it is desired to supply the output voltage V2.

The buck regulator of FIG. 11 is similar to that of FIG. 10, except that in the regulator of FIG. 11 the output end of the inductor 34 is connected to ground or 0 V, and the source of the MOSFET 34 and the terminal of the capacitor 36 that is connected thereto provide the output voltage V2 with a negative polarity, so that in this case V2=–V1. The gate of the MOSFET 32 is again driven via the level shifter 40, which in this case does not require the diode shown in FIG. 10.

Each of the arrangements of the buck regulator described above provides a second output voltage V2 using the components 13, 15, 17, and 18 of FIG. 4, or the components 30 to 36 (and 40 where required) for FIGS. 5 and 7 to 11. It can be appreciated that in any of these arrangements these components can be replicated to provide further additional output voltages if desired. Furthermore, it can be appreciated that features of the various regulators described above can be combined in different ways to provide other desired configurations of voltage regulator. In particular, it is observed that the MOSFET 20 can be replaced by any other suitable form of switch or, in particular circumstances, by a diode equivalent, and that the MOSFET 22 and/or the MOSFET 32 can be replaced by any other suitable form of switch or, where current flows in this switch in only one direction, by a diode as shown in FIG. 4.

Thus although particular embodiments of the invention have been described in detail, it can be appreciated that these and numerous other changes, variations, and adaptations may be made without departing from the scope of the invention as defined in the claims.

What is claimed is:

1. A buck regulator comprising:
   a first capacitor;
   a first inductor having an output end coupled to the first capacitor, the first inductor being responsive to a pulsed input supply for supplying current to the first capacitor during pulses of the input supply to charge the first capacitor to a first output voltage;
   a first device for maintaining current in the first inductor for charging the first capacitor between pulses of the input supply;
   a second capacitor;
   a second inductor, inductively coupled to the first inductor so that the first and second inductors form a transformer, the second inductor having an output end coupled to the second capacitor;
   a second device for allowing current flow in the second inductor between pulses of the input supply to charge the second capacitor to a second output voltage; and
   a further capacitor coupled between the first and second inductors at points thereof other than the output ends of the inductors, for allowing current flow in the second inductor for charging the second capacitor during pulses of the input supply.

2. A buck regulator as claimed in claim 1 wherein the first and second inductors have substantially equal numbers of turns of the transformer between the points of the inductors to which the further capacitor is coupled and the output ends of the inductors.

3. A buck regulator as claimed in claim 2 wherein the points of the first and second inductors at which the further capacitor is coupled are ends of the first and second inductors distant from the output ends thereof.

4. A buck regulator as claimed in claim 2 wherein the point of at least one of the first and second inductors at which the further capacitor is coupled is a tap between ends of the respective inductor.

5. A buck regulator as claimed in claim 2 wherein the first device is coupled to a tap between ends of the first inductor.

6. A buck regulator as claimed in claim 2 wherein the second device is coupled to a tap between ends of the second inductor.

7. A buck regulator as claimed in claim 2 wherein a junction between the second capacitor and the second device is coupled to the output end of the first inductor.

8. A buck regulator as claimed in claim 2 wherein a junction between the second capacitor and the second device is coupled to a junction between the first capacitor and the first device.

9. A buck regulator as claimed in claim 2 wherein the output end of the second inductor is coupled to a junction between the first capacitor and the first device, and a junction between the second capacitor and the second device is coupled to an output terminal for the second output voltage.

10. A buck regulator as claimed in claim 2 wherein at least one of the first and second devices comprises a diode.

11. A buck regulator as claimed in claim 2 wherein at least one of the first and second devices comprises a semiconductor switch.

12. A buck regulator as claimed in claim 1 wherein a junction between the second capacitor and the second device is coupled to the output end of the first inductor.

13. A buck regulator as claimed in claim 1 wherein a junction between the second capacitor and the second device is coupled to a junction between the first capacitor and the first device.

14. A buck regulator as claimed in claim 1 wherein the output end of the second inductor is coupled to a junction between the first capacitor and the first device, and a junction between the second capacitor and the second device is coupled to an output terminal for the second output voltage.

15. A circuit comprising a first capacitor; a first inductor; a controlled switch for supplying current, when the switch is closed, via the first inductor to the first capacitor for charging the first capacitor to a first output voltage; a first freewheel device for maintaining current via the first inductor when the switch is opened; a second inductor inductively coupled to the first inductor; a second capacitor and a second device coupled to the second inductor for supplying current to the second capacitor for charging the second capacitor to a second output voltage when the switch is closed; and a further capacitor coupled between the first and second inductors for allowing current to flow in the second inductor for charging the second capacitor when the second device is non-conductive.

16. A circuit as claimed in claim 15 wherein the further capacitor is coupled between the inductors at points so that there is a one-to-one turns ratio of the inductors between said points and connections of the inductors to the first and second capacitors.

17. A circuit as claimed in claim 16 wherein one of the first and second devices is coupled to the respective one of the first and second inductors at a tap between ends of the respective inductor.

18. A buck regulator providing two outputs, comprising:
   a pulsed input supply;
   a first inductor directly coupled to said pulsed input supply;
   a second inductor;
   a first output capacitor coupled to the output of said first inductor;
   a second output capacitor coupled to the output of said second inductor;
   first device means for allowing current to flow in said first inductor for charging said first output capacitor during intervals between pulses of said pulsed input supply;
   second device means for allowing current to flow in said second inductor for charging said second output capacitor during intervals between pulses of said pulsed input supply;
   inductive coupling means for inductively coupling said first and said second inductors; and
   capacitive coupling means for allowing current flow in said second inductor for charging said second capacitor during pulses of said input supply.

19. A buck regulator as claimed in claim 18 wherein said capacitive coupling means comprises a capacitor coupled between the inductors at points so that there is a one-to-one turns ratio of the inductors between said points and connections of the inductors to the respective output capacitors.

20. A buck regulator as claimed in claim 18, wherein said second device means comprises a rectifying device coupled to said second inductor at a tap between ends of the second inductor.

21. A buck regulator as claimed in claim 18, wherein said first device means comprises a rectifying device coupled to said first inductor at a tap between ends of the first inductor.

22. A buck regulator as claimed in claim 18 wherein said capacitive coupling means comprises a capacitor connected between the inputs of said first and said second inductors.

23. A buck regulator as claimed in claim 18 wherein said capacitive coupling means comprises a capacitor connected between the input of one said inductor and a tap between the ends of the other said inductor.

* * * * *